Feb. 10, 1953 — G. F. KUHN — 2,628,157
CATALYST REGENERATOR
Filed June 21, 1947

REGENERATOR

AIR

SPENT CATALYST

FLUE GAS AND CATALYST

INVENTOR
GEORGE F. KUHN
BY
Pennie, Edmonds, Morton + Barrows
ATTORNEYS

Patented Feb. 10, 1953

2,628,157

UNITED STATES PATENT OFFICE 2,628,157

CATALYST REGENERATOR

George F. Kuhn, Sinclair, Wyo., assignor to Sinclair Refining Company, New York, N. Y., a corporation of Maine Application June 21, 1947, Serial No. 756,294

1 Claim. (Cl. 23—284)

This invention relates to pyrolytic conversion of hydrocarbons and more particularly to pyrolytic conversion processes involving the use of catalysts.

In the conversion of hydrocarbon base stocks to produce products having desired properties, such as high octane number for use in gasoline, the stock is submitted to one of several processes, such as cracking, hydrogenation, dehydrogenation, etc., in the presence of a catalyst.

In such processes, the spent catalyst is regenerated for further use by burning off the carbonaceous deposits. The present invention is directed more specifically to the process of regenerating the catalyst and to apparatus for this purpose. To effectively regenerate the catalyst in those processes in which the regeneration is not carried out in the reactor, the regenerating chamber must be of such size that the passage of spent catalyst and air through it requires sufficient time to burn off the carbonaceous deposits. As it is also necessary to provide cooling means to prevent injury to the catalyst particles by overheating, the size of such chambers is further increased. These regenerating chambers are generally built vertically, that is, with the inlet or outlet at the bottom and the outlet or inlet at the top.

In the present invention I carry out the regeneration of the catalyst in a horizontal chamber. This greatly simplifies the cost of construction and maintenance. The chamber is preferably formed circular to position the inlet and outlet near each other and facilitate connections to the reactor and other vessels. However, the chamber can be made in a straight section, depending on its length and the ease with which connections could be made into and out of the regenerator from the reactor and other vessels. In the specific form of the invention herein illustrated the catalyst and air are delivered to the chamber at one end. They flow through the chamber, the catalyst being burned by the air, over baffles to the other end of the chamber where the outlet is provided. Cooling coils are preferably arranged adjacent the baffles.

In the accompanying drawing I have shown an arrangement of apparatus elements suitable for use in practicing the process and forming a part of the invention. In the drawing.

Figure 1:
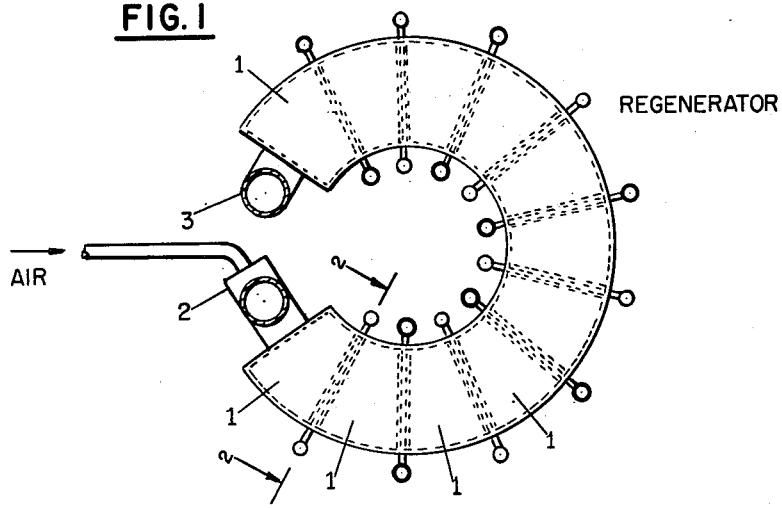
Fig. 1 is a plan view of a horizontal regenerator of circular form.
Figure 3:
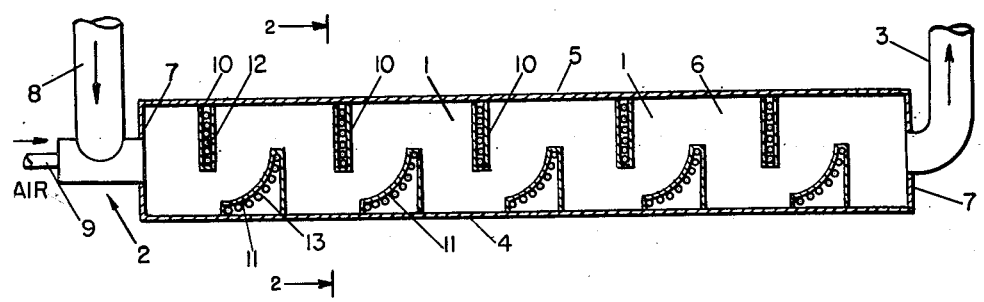
Fig. 3 is a longitudinal, sectional view of a straight horizontal regenerator.

Referring to the drawing, in Fig. 1 I have illustrated a regenerator consisting of a series of sections 1, which are arranged in a circular form and provided with an inlet 2 and an outlet 3. As the detailed construction is better shown in the sectional views and as the construction of Fig. 1 and the construction of Fig. 3 is the same, except that the sections 1 in Fig. 1 are arranged circularly and the sections 1 of Fig. 3 are arranged in a straight line, the detailed construction will be described in connection with the latter two figures. As shown, the regenerator consists of a bottom 4, top 5, side walls 6 and end walls 7. As shown, the distance between the top and bottom is relatively small in comparison to the distance between the end walls 7 and the flow is from the inlet 2 to the outlet 3 longitudinally or axially of the chamber. The spent catalyst is introduced at the inlet end through a pipe 8 and air from a blower or other source is injected through pipe 9. The flue gas and regenerated catalyst exhaust through pipe 3 at the outlet end and are conveyed to a suitable separator from which the regenerated catalyst may be conveyed to the reactor.

Figure 2:
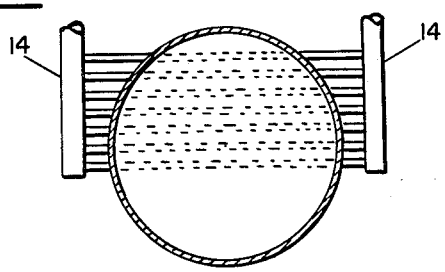
Fig. 2 is a transverse, vertical, sectional view on line 2—2 of Fig. 3.

Within the chamber I provide a series of baffles. As shown, alternate baffles 10 project from the top 5, preferably slightly more than half the height of the regenerating chamber. Between each pair of baffles 10 I provide a curved baffle 11 extending upwardly from the bottom more than half the height of the regenerating chamber so that the air and catalyst flow through the chamber in a tortuous path. Cooling tubes 12 may be arranged behind the baffles 10 and similar cooling tubes 13 may be arranged behind the baffles 11. Water, or other suitable cooling medium, may be circulated through these tubes. As shown in Fig. 2 of the drawing, each set of tubes is connected to headers 14 at opposite sides, one of which serves as an inlet for the cooling fluid and the other of which serves as an exhaust.

In constructing the baffles and cooling tubes, the baffles may be formed of steel with the cooling tubes welded to the unexposed sides of the baffles. Or the tubes may be arranged to form the baffle members and the plates 10 and 11 eliminated.

The manner in which the process is practiced will be apparent from the foregoing description. Spent catalyst is conveyed to the inlet tube through pipe 8 and air is injected into the pipe 2 from pipe 9. The air with the catalyst suspended therein, flows through the regenerating chamber in a tortuous path over the baffles 10 and 11 to the outlet 3. If necessary, to prevent overheating of the catalyst particles as the carbonaceous material is burned off them, water or other cooling fluid may be circulated through the pipes 12 and 13.

The advantages, both in the initial construction of the regenerator and in its maintenance, will be apparent. By employing a horizontal chamber, parts which may require repair are more readily accessible than if a chamber of sufficient size to function as a regenerating chamber is arranged vertically. By forming the regenerating chamber circular as shown in Fig. 1, the disadvantage of having the inlet and outlet widely spaced from each other may be obviated.

I claim:

Apparatus of the character described consisting of an elongated, arcuate, horizontal, tubular, regeneration chamber having vertical end walls in close relationship to each other, a single inlet mounted in one end wall, a single outlet mounted in the other end wall, pipe means connected to said inlet for supplying spent catalyst and air under pressure to said inlet, spaced vertical baffles extending downwardly from the top of the chamber and terminating at a substantial distance above the bottom of the chamber, curved baffles extending upwardly from the bottom of the chamber and terminating at a level above the lower ends of the vertical baffles in the spaces between said vertical baffles, each of said curved baffles having a concave surface facing upstream toward the lower end of one of said vertical baffles, and cooling tubes mounted in said vertical baffles and said curved baffles.

GEORGE F. KUHN.

REFERENCES CITED

The following references are of record in the file of this patent:

UNITED STATES PATENTS

| Number | Name | Date |
| --- | --- | --- |
| 2,248,196 | Plummer | July 8, 1941 |
| 2,273,075 | Weems | Feb. 17, 1942 |
| 2,305,569 | Degnen | Dec. 15, 1942 |
| 2,354,546 | Reeves | July 25, 1944 |
| 2,386,366 | Storment | Oct. 9, 1945 |
| 2,404,944 | Brassert | July 30, 1946 |
| 2,419,245 | Arveson | Apr. 22, 1947 |
| 2,490,986 | Symonds | Dec. 13, 1949 |
| 2,538,235 | Coffey | Jan. 16, 1951 |